(12) United States Patent
Lu et al.

(10) Patent No.: US 12,279,713 B2
(45) Date of Patent: Apr. 22, 2025

(54) COOKING UTENSIL

(71) Applicant: FOSHAN SHUNDE MIDEA ELECTRICAL HEATING APPLIANCES MANUFACTURING CO., LTD., Foshan (CN)

(72) Inventors: Junshan Lu, Foshan (CN); Zhixi Cheng, Foshan (CN); Weigang Lv, Foshan (CN); Yun Yang, Foshan (CN); Yonggang Zhang, Foshan (CN); Pingying Han, Foshan (CN)

(73) Assignee: FOSHAN SHUNDE MIDEA ELECTRICAL HEATING APPLIANCES MANUFACTURING CO., LTD., Foshan (CN)

( * ) Notice: Subject to any disclaimer, the term of this patent is extended or adjusted under 35 U.S.C. 154(b) by 903 days.

(21) Appl. No.: 17/436,061

(22) PCT Filed: Oct. 12, 2019

(86) PCT No.: PCT/CN2019/110821
§ 371 (c)(1),
(2) Date: Sep. 2, 2021

(87) PCT Pub. No.: WO2020/177323
PCT Pub. Date: Sep. 10, 2020

(65) Prior Publication Data
US 2022/0175171 A1 Jun. 9, 2022

(30) Foreign Application Priority Data
Mar. 5, 2019 (CN) .......................... 201910164767.0

(51) Int. Cl.
*A47J 27/086* (2006.01)
*A47J 37/06* (2006.01)

(52) U.S. Cl.
CPC ......... *A47J 27/086* (2013.01); *A47J 37/0641* (2013.01)

(58) Field of Classification Search
CPC .......................... A47J 27/086; A47J 37/0641
(Continued)

(56) References Cited

U.S. PATENT DOCUMENTS

| 5,111,026 A * | 5/1992 | Ma | A47J 27/62 |
| | | | 219/442 |
| 2004/0035845 A1* | 2/2004 | Moon | F24C 15/006 |
| | | | 219/400 |
| 2006/0151463 A1* | 7/2006 | Jian | A47J 27/004 |
| | | | 219/429 |

FOREIGN PATENT DOCUMENTS

| CA | 2828399 A1 * | 7/2013 | ............. H05B 6/065 |
| CN | 201239008 Y * | 5/2009 | |

(Continued)

OTHER PUBLICATIONS

OA for CN application 201910164767.0.
(Continued)

*Primary Examiner* — Helena Kosanovic
*Assistant Examiner* — Shruti Shree Sharma

(57) ABSTRACT

A cooking utensil, the cooking utensil having a first cooking mode includes a pot body assembly, provided with a first heating assembly for heating ingredients in a cooking cavity of the pot body assembly; and a first pot lid assembly, including a pot lid body and a second heating assembly for heating the ingredients in the cooking cavity, and the first pot lid assembly covers the pot body assembly. When the cooking utensil receives a cooking instruction, both the first heating assembly and the second heating assembly heat the ingredients in the cooking cavity, and the cooking utensil is in the first cooking mode.

13 Claims, 9 Drawing Sheets

(58) Field of Classification Search
USPC .......................................................... 99/331
See application file for complete search history.

(56) References Cited

FOREIGN PATENT DOCUMENTS

| CN | 202044091 | U |   | 11/2011 |
| CN | 202312830 | U | * | 7/2012 |
| CN | 203493417 | U |   | 3/2014 |
| CN | 203914511 | U |   | 11/2014 |
| CN | 104490286 | A |   | 4/2015 |
| CN | 104586233 | A | * | 5/2015 |
| CN | 205251310 | U |   | 5/2016 |
| CN | 107536449 | A | * | 1/2018 |
| CN | 207412008 | U |   | 5/2018 |
| CN | 108158418 | A | * | 6/2018 | .............. A47J 27/08 |
| CN | 108294643 | A |   | 7/2018 |
| CN | 108402891 | A |   | 8/2018 |
| CN | 207734020 | U |   | 8/2018 |
| CN | 208355201 | U |   | 1/2019 |
| CN | 109363520 | A | * | 2/2019 | .............. A47J 27/08 |
| CN | 208524505 | U |   | 2/2019 |
| JP | 2015180289 | A |   | 10/2015 |
| JP | 2016041273 | A |   | 3/2016 |

OTHER PUBLICATIONS

ISR for PCT application No. PCT/CN2019/110821.
First OA for CN application 201910164767.0.
Search Report for EP application 19918398.9 mailed Mar. 11, 2022.

* cited by examiner

COOKING UTENSIL

CROSS-REFERENCES TO RELATED APPLICATIONS

The present disclosure is a national phase application of International Application No. PCT/CN2019/110821, filed on Oct. 12, 2019, which claims the priority of Chinese patent application No. 201910164767.0 filed on Mar. 5, 2019, the entireties of which are herein incorporated by reference.

FIELD

The present disclosure relates to a field of kitchen appliances, and more particularly to a cooking appliance.

BACKGROUND

In a related art, an electric pressure cooker has a single function, which is usually used to cook food by boiling, but it does not have a frying function, or fries the food by using a conventional manner of bottom cooking, which provides a too poor frying effect. A user needs to purchase multiple cooking appliances to achieve the processing such as boiling, stewing, frying or the like of the food material respectively.

SUMMARY

The present disclosure is intended to solve at least one of the problems existing in the related art. For this reason, a purpose of the present disclosure is to propose a cooking appliance, which can fry a food material, and the frying effect is good.

A cooking appliance according to an embodiment of the present disclosure, has a first cooking mode and includes: a pot body assembly provided with a first heating assembly for heating a food material in the pot body assembly; a first pot cover assembly including a pot cover body and provided with a second heating assembly for heating the food material in the cooking chamber. The first pot cover assembly is closed on the pot body assembly. When the cooking appliance receives a cooking instruction, the first heating assembly and the second heating assembly both heat the food material in the cooking chamber, and the cooking appliance is in the first cooking mode.

The cooking appliance according to the embodiment of the present disclosure can fry the food material, with both the first heating assembly and the second heating assembly heating the food material. Moreover, the food material is heated more evenly. The frying efficiency is high and the taste of the food material is better.

In addition, the cooking appliance according to the above embodiment of the present disclosure may also have the following additional features.

According to some embodiments of the present disclosure, the pot body assembly is provided with a lower coupler, and the first pot cover assembly has a first upper coupler arranged to the pot cover body. When the first pot cover assembly is closed on the pot body assembly, the lower coupler is coupled with the first upper coupler so that the second heating assembly is energized to operate.

Further, the cooking appliance further has a second cooking mode, and the cooking appliance further includes a second pot cover assembly closed on the pot body assembly, and when the first heating assembly operates, the cooking appliance is in the second cooking mode.

Further, the second pot cover assembly is provided with a second upper coupler, and when the cooking appliance is in the second cooking mode, the lower coupler is coupled with the second upper coupler.

According to some embodiments of the present disclosure, the pot body assembly includes: a housing; a pot body arranged in the housing, the first heating assembly being arranged in the pot body; a control system connected with the housing and configured to control the first heating assembly and the second heating assembly to operate. The second heating assembly achieves a signal connection through the first upper coupler and the lower coupler.

Further, the cooking appliance further includes: a first temperature sensor for detecting a temperature in the cooking chamber, the control system being connected with the first temperature sensor to control the first heating assembly to operate according to a temperature detection result of the first temperature sensor; and/or a second temperature sensor for detecting a temperature in the cooking chamber, the control system being connected with the second temperature sensor to control the second heating assembly to operate according to a temperature detection result of the second temperature sensor.

Further, the first heating assembly is arranged to a bottom of the pot body assembly, the first temperature sensor is configured to detect a temperature in a lower part of the cooking chamber, and the second temperature sensor is connected with the pot cover body and configured to detect a temperature in an upper part of the cooking chamber.

Further, the second heating assembly includes a heating tube extending horizontally and spirally, and the second temperature sensor is arranged in the center of the heating tube.

In some embodiments of the present disclosure, the first pot cover assembly further includes a fan assembly arranged to the pot cover body. When the cooking appliance is in the first cooking mode, the fan assembly is energized to operate to blow a wind into the cooking chamber.

According to some embodiments of the present disclosure, the second cooking mode is a pressure cooking mode, and the first cooking mode is a baking cooking mode.

According to some embodiments of the present disclosure, the first cooking mode includes a constant temperature stage and a constant power stage. In the constant temperature stage, the first heating assembly heats switchably between at least two heating powers, and the second heating assembly heats switchably between at least two heating powers.

In some embodiments of the present disclosure, when the cooking appliance is in the first cooking mode, a total operating time of the first heating assembly is T1, and a duration of the first cooking mode is T0, in which $T1 \leq T0$.

According to some embodiments of the present disclosure, a heating power of the first heating assembly includes a first heating power P1 and a second heating power P2, and the first heating assembly heats alternately with the first heating power P1 and the second heating power P2. A heating power of the second heating assembly includes a third heating power P3 and a fourth heating power P4, and the second heating assembly heats alternately with the third heating power P3 and the fourth heating power P4. $P1 > P2$, $P3 > P4$, $P2 \geq 0$, $P4 \geq 0$.

Further, when the heating power of the first heating assembly is the first heating power P1, the heating power of the second heating assembly is the fourth heating power P4, and when the heating power of the first heating assembly is the second heating power P2, the heating power of the second heating assembly is the third heating power P3. Or, when the heating power of the first heating assembly is the first heating power P1, the heating power of the second heating assembly is the third heating power P3, and when the heating power of the first heating assembly is the second heating power P2, the heating power of the second heating assembly is the fourth heating power P4. Or, when the heating power of the first heating assembly is the first heating power P1, the second heating assembly switches to the fourth heating power P4 and heats for a second predetermined time after heating with the third heating power P3 for a first predetermined time, and when the first heating assembly heats with the second heating power P2, the second heating assembly switches to the third heating power P3 and continues for a fourth predetermined time after heating with the fourth heating power P4 for a third predetermined time.

According to some embodiments of the present disclosure, the first cooking mode further includes a preheating stage. In the preheating stage, a heating power of the first heating assembly increases uniformly from zero to a highest heating power and is kept at the highest heating power until the preheating stage ends, and a heating power of the second heating assembly increases uniformly from zero to a highest heating power and is kept at the highest heating power until the preheating stage ends.

Embodiments of the present disclosure will be given partly in the following description, a part of which will become apparent from the following description or be learned from the practice of the present disclosure.

BRIEF DESCRIPTION OF THE DRAWINGS

Embodiments of the present disclosure will become apparent and easy to understand from descriptions of embodiments in connection with following drawings, in which.

Figure 1:
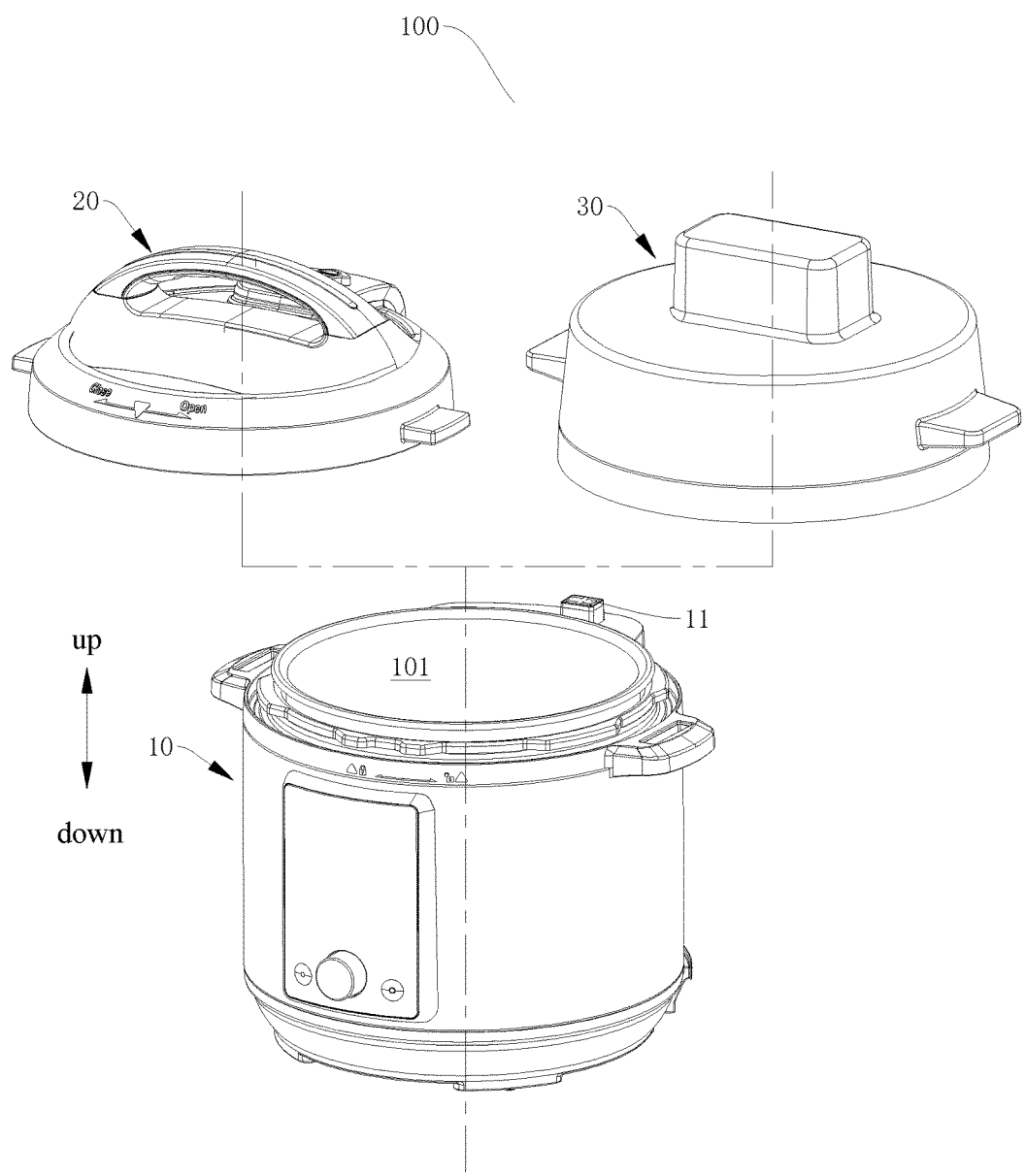
FIG. 1 is a schematic view of a cooking appliance according to an embodiment of the present disclosure.

REFERENCE NUMERALS cooking appliance 100;
pot body assembly 10; cooking chamber 101; lower coupler 11; first heating assembly 12; housing 13; pot body 14; control system 15;
second pot cover assembly 20;
first pot cover assembly 30; pot cover body 31; first upper coupler 32; second heating assembly 33; fan assembly 34;
first temperature sensor 40; second temperature sensor 41.

DETAILED DESCRIPTION OF THE DISCLOSURE

Embodiments of the present disclosure are described in detail below, and examples of the embodiments are shown in the drawings. Same or similar reference numerals from beginning to end indicate same or similar elements or elements having same or similar functions. The embodiments described below with reference to the attached drawings are exemplary and are only intended to interpret the present disclosure and cannot be understood as a limitation to the present disclosure.

In the description of the present disclosure, it is should be understood that the orientation or position relationships indicated by the terms "central", "up", "down", "front", "rear", "vertical", "horizontal", "top", "bottom", "inner", "outer", "axial", "radial" and "circumferential" are based on the orientation or position relationships shown in the attached drawings, only for the convenience of describing the present disclosure and simplifying the description, instead of indicating or implying that the device or element referred to must have a specific orientation and be constructed and operated in a specific orientation, and thus cannot be understood as a limitation of the present disclosure.

A cooking appliance 100 according to embodiments of the present disclosure is described below with reference to the attached drawings.

Referring to FIG. 1-5, a cooking appliance 100 according to an embodiment of the present disclosure may include a pot body assembly 10 and a first pot cover assembly 20.

In one embodiment, as shown in FIG. 1, the pot body assembly 10 may be provided with a first heating assembly 12, and the first heating assembly 12 may heat a food material in a cooking chamber 101 of the pot body assembly 10. The first pot cover assembly 30 may be closed on the pot body assembly 10.

As shown in FIG. 2-5, the first pot cover assembly 30 includes a pot cover body 31 and a second heating assembly 33, and the second heating assembly 33 may also heat the food material in the cooking chamber 101 of the pot body assembly 10. When the first pot cover assembly 30 is closed on the pot body assembly 10 and the cooking appliance receives a cooking instruction, the first heating assembly 12 and the second heating assembly 33 both heat the food material in the cooking chamber 101, and the cooking appliance 100 is in a first cooking mode, to process the food material through the first heating assembly 12 and the second heating assembly 33, such as steaming, braising, boiling, frying or air frying, etc.

Thus, the first heating assembly 12 and the second heating assembly 33 may heat the food material from different positions and angles, so that the heating of the food material is more even, which is conducive to improve the cooking effect. Moreover, with both the first heating assembly 12 and the second heating assembly 33 heating the food material, the frying process of the food material can be realized. The frying effect is good, the speed is fast, the surface of the food is crisp and the taste is great.

For example, in an embodiment where the first heating assembly 12 heat the food material from a lower side of the food material and the second heating assembly 33 heat the food material from an upper side of the food material, the cooperation of the first heating assembly 12 and the second heating assembly 33 realizes the cooking effect of the food material that upper and lower surfaces of the food material are heated evenly, and the food material is cooked from the upper surface and the lower surface to an interior thereof, which is conducive to improving the cooking evenness and the cooking efficiency of the food material.

In the cooking appliance 100 according to the embodiment of the present disclosure, the frying process of the food material may be realized through the heating of the food material via both the first heating assembly 12 and the second heating assembly 33. Further, the food material is heated evenly, the frying efficiency is high, and the taste of the food material is great.

In the present disclosure, a power supply mode of the first pot cover assembly 30 does not have special restrictions. In some embodiments, the first pot cover assembly 30 and the pot body assembly 10 may be supplied with power independently. Thus, when separated from the pot body assembly 10, the first pot cover assembly 30 may also be closed on other pot bodies for heating, which is conducive to improving the practicability of the first pot cover assembly 30.

Figure 2:
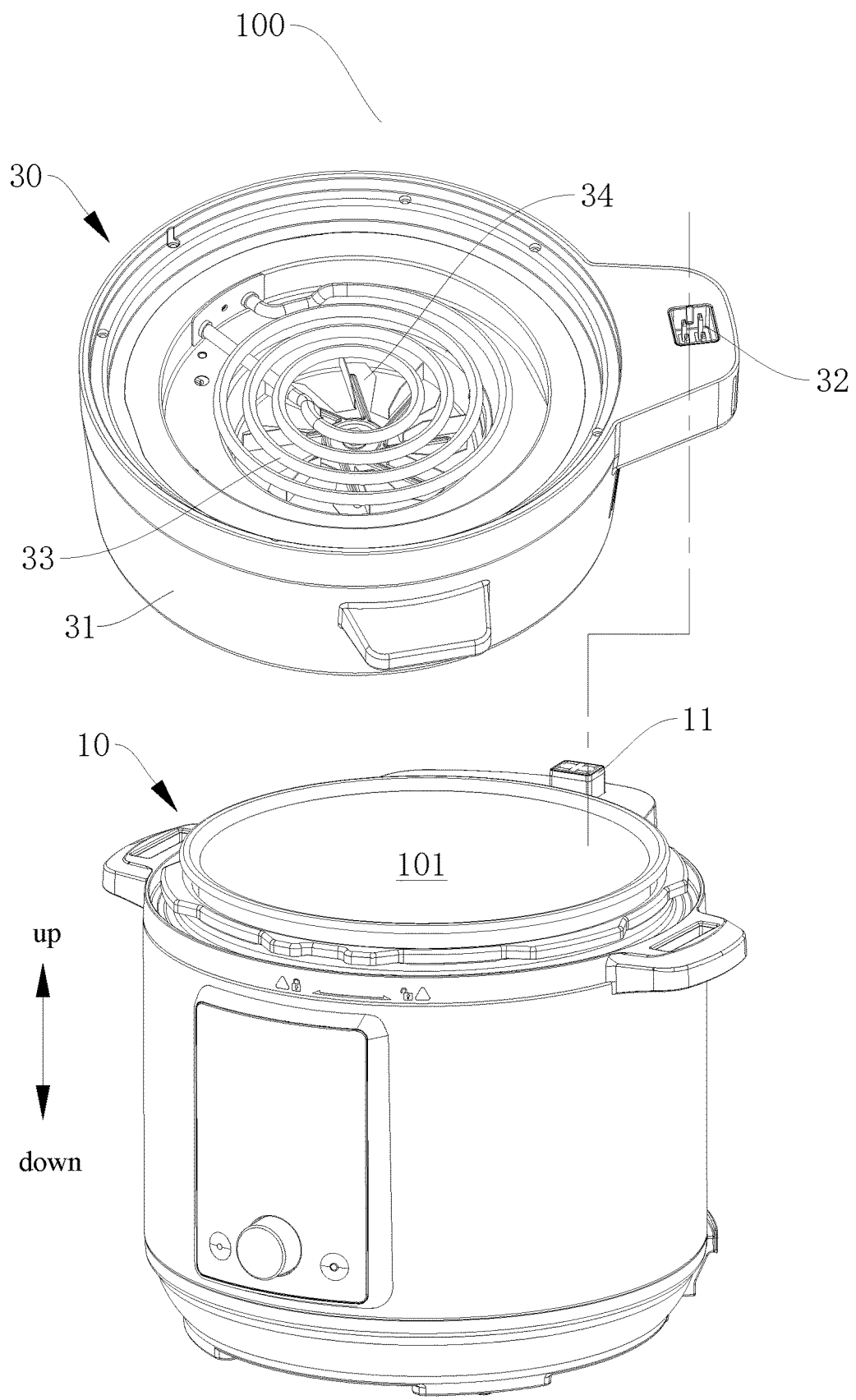
FIG. 2 is a schematic view of a pot body assembly and a first pot cover assembly of a cooking appliance according to an embodiment of the present disclosure.

In other embodiments, the first pot cover assembly 30 may be connected with the pot body assembly 10 through a coupler, to be supplied with power through the pot body assembly 10. In one embodiment, as shown in FIG. 2, the pot body assembly 10 may be provided with a lower coupler 11, and the first pot cover assembly 30 may have a first upper coupler 32 arranged to the pot cover body 31. When the first pot cover assembly 30 is closed on the pot body assembly 10, the lower coupler 11 may be coupled with the first upper coupler 32, so that the second heating assembly 33 may be energized to operate. Through the coupling of the lower coupler 11 with the first upper coupler 32, an electrical connection of the first pot cover assembly 30 can be realized. The structure of the electrical connection may be disassembled, and the assembling and disassembling are convenient. The electrical connection is more stable. The second heating assembly 33 operates more stably. The assembling and disassembling of the first pot cover assembly 30 and the pot body assembly 10 are more convenient.

Further, the cooking appliance 100 may also have a second cooking mode. As shown in FIG. 1, the cooking appliance 100 may also include a second pot cover assembly 20. When the second pot cover assembly 20 is closed on the pot body assembly 10 and the first heating assembly 12 operates, the cooking appliance 100 is in the second cooking mode. The food material may be processed only through the first heating assembly 12, such as being steamed, braised, boiled, fried, and air fried, etc.

In the cooking appliance 100 according to some embodiments of the present disclosure, the second pot cover assembly 20 and the first pot cover assembly 30 may be fitted with the pot body assembly 10, respectively. The first cooking mode and the second cooking mode may be switched by switching the second pot cover assembly 20 and the first pot cover assembly 30. Thus, the cooking appliance 100 may realize different cooking functions and the functions are diversified, which will meet different cooking needs. A user may achieve various cooking modes without purchasing multiple cooking appliances. Further, the disassembling is simple and it is convenient to use the cooking appliance.

According to some embodiments of the present disclosure, the second pot cover assembly 20 may be provided with a second upper coupler. When the cooking appliance 100 is in the second cooking mode, the lower coupler 11 may be coupled with the second upper coupler, so that the second pot cover assembly 20 may be energized to operate. It is to be noted that in an embodiment where the second pot cover assembly 20 does not include a component to be supplied with power, the second pot cover assembly 20 may not be provided with the second upper coupler, or the second upper coupler and the lower coupler 11 do not need to be electrically connected.

Figure 3:
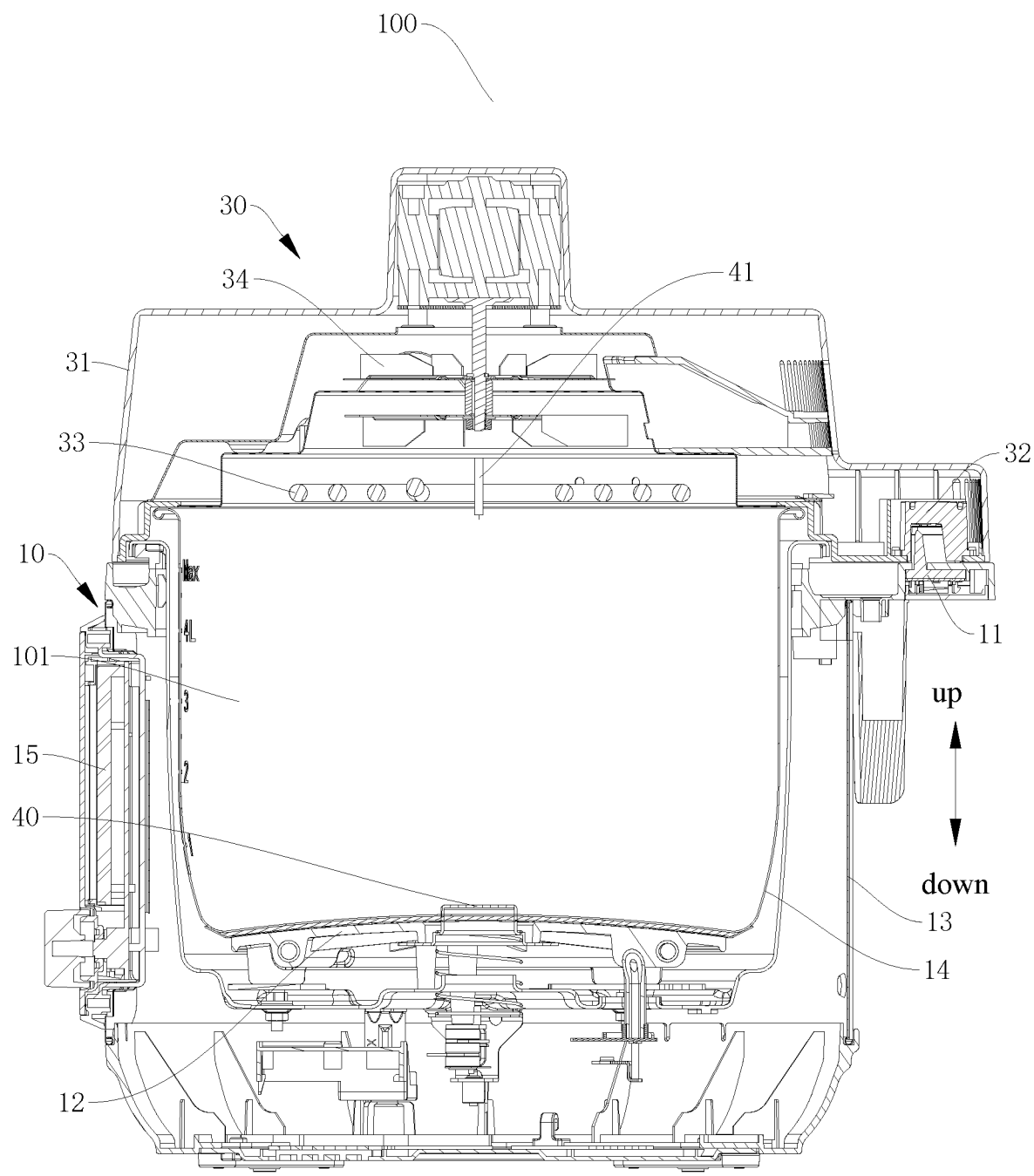
FIG. 3 is a sectional view of a pot body assembly and a first pot cover assembly of a cooking appliance according to an embodiment of the present disclosure.
Figure 4:
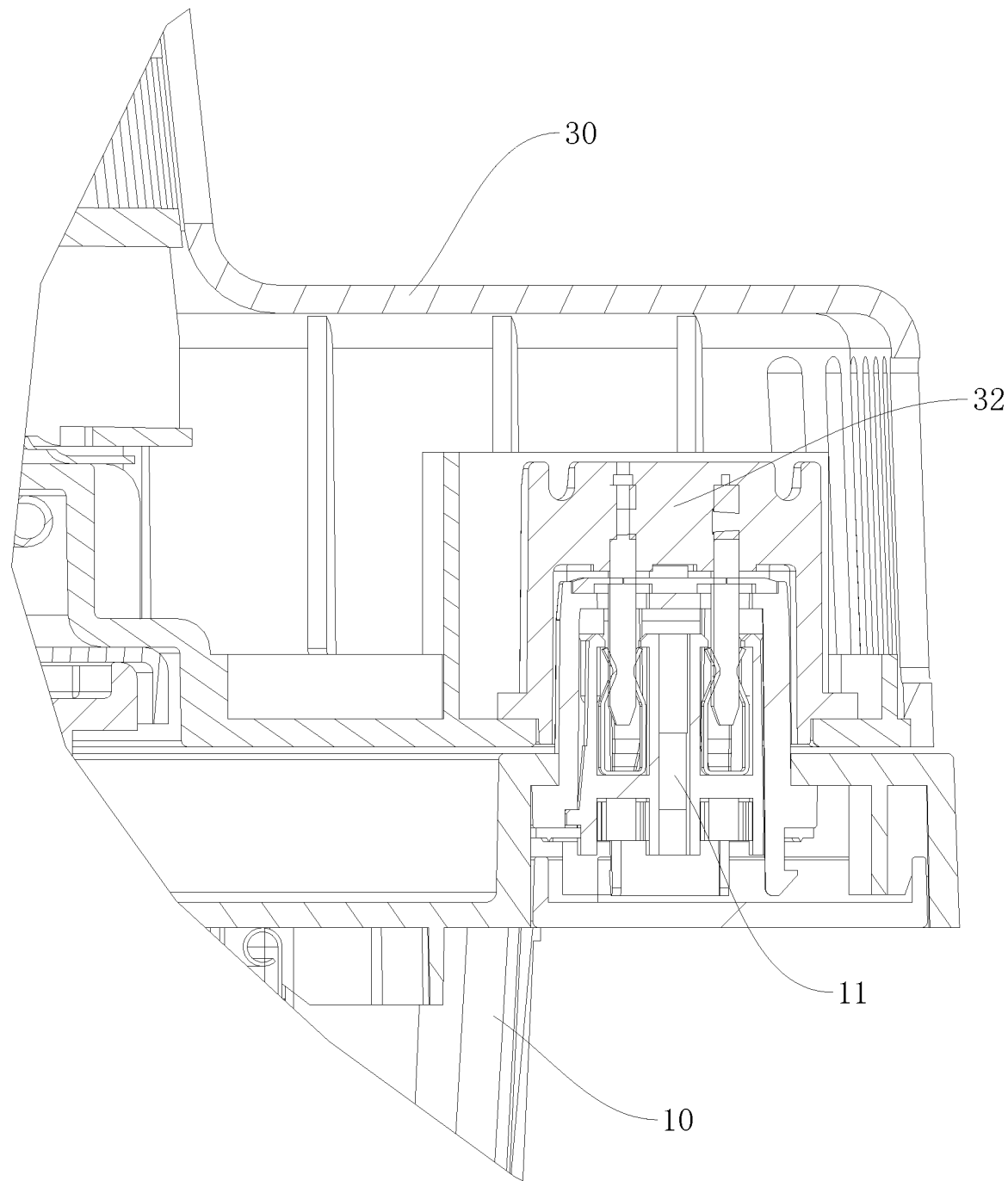
FIG. 4 is a partial sectional view of a pot body assembly and a first pot cover assembly of a cooking appliance according to an embodiment of the present disclosure.

In some embodiments of the present disclosure, as shown in FIG. 3, the pot body assembly 10 may include a housing 13, a pot body 14, and a control system 15. The pot body 14 may be arranged in the housing 13, and the first heating assembly 12 may be arranged in the pot body 14, so that the first heating assembly 12 may heat the food material in the cooking chamber 101. In one embodiment, the first heating assembly 12 may be arranged to least one of a lower side of the pot body 14 and an outer side of an outer circumferential surface of the pot body 14.

In addition, as shown in FIG. 3, the control system 15 may be connected to the housing 13, and the control system 15 may control the first heating assembly 12 and the second heating assembly 33 to operate. Thus, the first heating assembly 12 and the second heating assembly 33 are controlled by the same control system 15, which may simplify the structure of the first pot cover assembly 30 and hence simplify the structure of the cooking appliance 100. In addition, in an embodiment where the first pot cover assembly 30 and the pot body assembly 10 are coupled through the first upper coupler 32 and the lower coupler 11, a signal connection of the second heating assembly 33 with the control system 15 may be realized through the first upper coupler 32 and the lower coupler 11. Thus, structures of an electrical transmission and a signal transmission of the second heating assembly 33 are integrated, which further simplifies the structure of the cooking appliance 100. Further, it is convenient to assemble and disassemble the first pot cover assembly 30 with the pot body assembly 10.

Figure 5:
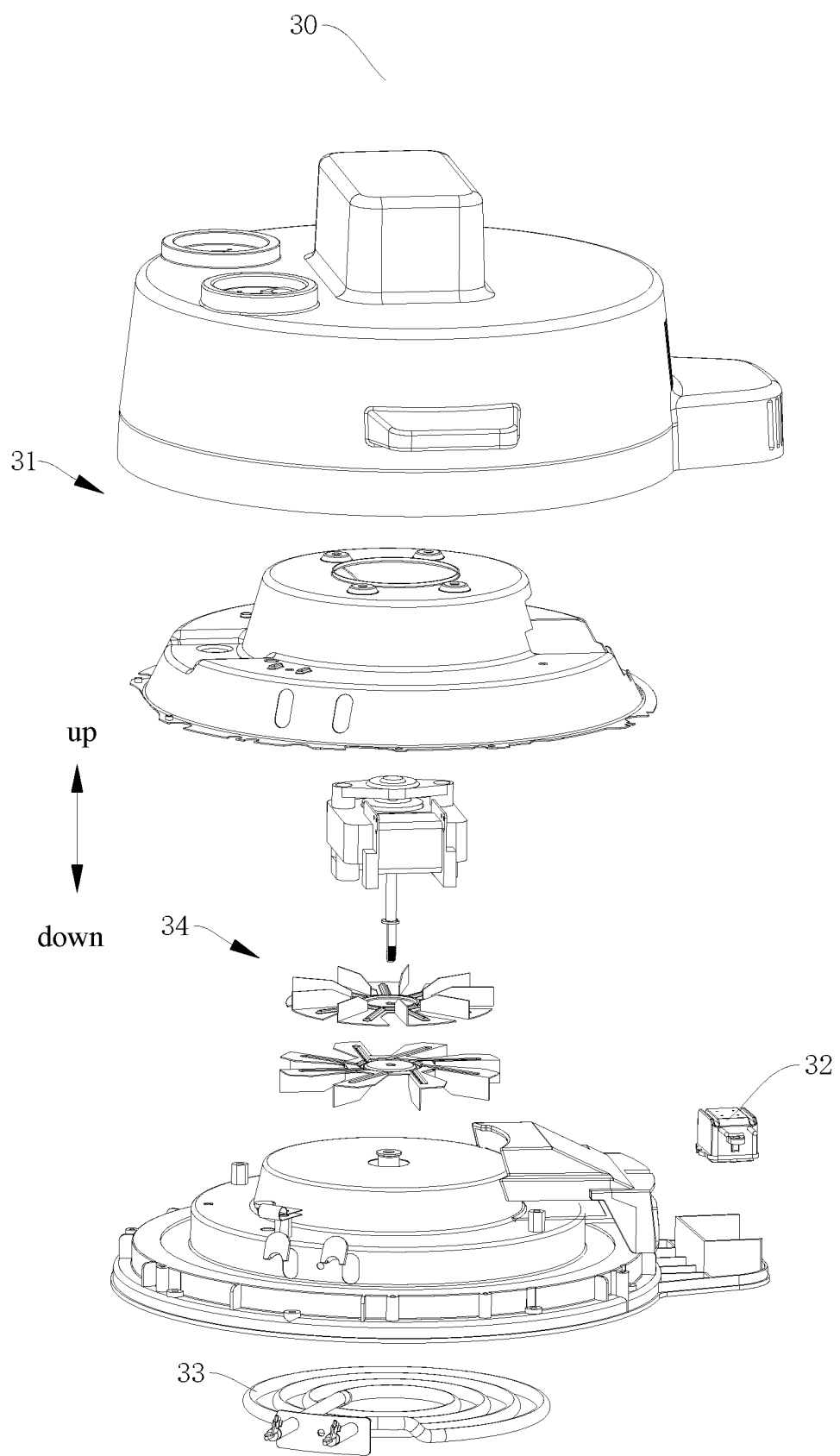
FIG. 5 is an exploded view of a first pot cover assembly of a cooking appliance according to an embodiment of the present disclosure.

Further, as shown in FIGS. 3 and 5, the cooking appliance 100 may further include a first temperature sensor 40 and a second temperature sensor 41. The first temperature sensor 40 may detect a temperature in the cooking chamber 101, and the control system 15 may be connected with the first temperature sensor 40, to control the first heating assembly 12 to operate according to a temperature detection result of the first temperature sensor 40, so that a heating temperature and an on-off state of the first heating assembly 12 meet use requirements. The second temperature sensor 41 may detect the temperature in the cooking chamber 101, and the control system 15 may be connected with the second temperature sensor 41, to control the second heating assembly 33 to operate according to a temperature detection result of the second temperature sensor 41, so that a heating temperature and an on-off state of the second heating assembly 33 meet the use requirements.

It is to be noted that, in the present disclosure, the cooking appliance 100 may include only one of the first temperature sensor 40 and the second temperature sensor 41, or may also include both the first temperature sensor 40 and the second temperature sensor 41.

Further, as shown in FIG. 3, the first heating assembly 12 may be arranged to a bottom of the pot body assembly 10 to heat the food material from the lower side. The first temperature sensor 40 may detect a temperature in a lower part of the cooking chamber 101, and the operation of the first heating assembly 12 is controlled according to the temperature detection result of the lower part of the cooking chamber 101. The temperature detection result of the first temperature sensor 40 is more accurate and the control of the heating temperature of the first heating assembly 12 is more accurate. The second temperature sensor 41 is connected with the pot cover body 31, and the second temperature sensor 41 may detect a temperature in an upper part of the cooking chamber 101, and the operation of the second heating assembly 33 is controlled according to the temperature detection result of the upper part of the cooking chamber 101. The temperature detection result of the second temperature sensor 41 is more accurate and the control of the heating temperature of the second heating assembly 33 is more accurate.

The first heating assembly 12 and the second heating assembly 33 respectively heat the food material from the lower side and the upper side, and the food material is heated more evenly, which is conducive to improving the cooking taste. Moreover, operating states of the first heating assembly 12 and the second heating assembly 33 are controlled independently, which can meet more cooking needs.

Further, as shown in FIGS. 3 and 5, the second heating assembly 33 may include a heating tube extending horizontally and spirally, and the second temperature sensor 41 may be located in the center of the heating tube. The second temperature sensor 41 is closer to the heating tube, the temperature detection result is more accurate and the structure is more compact. In one embodiment, the second temperature sensor 41 may extend into the upper part of the cooking chamber 101 to further improve the accuracy of the temperature detection.

In one embodiment, as shown in FIG. 3, in an embodiment where the pot body assembly 10 includes the pot body 14 and the housing 13, the pot body 14 may include an inner pot and an outer pot, the inner pot is arranged in the outer pot and the inner pot has the cooking chamber 101. The first temperature sensor 40 may be arranged to the outer pot, and the first temperature sensor 40 may abut with a lower wall surface of the inner pot, and the temperature of the lower part of the cooking chamber 101 is detected by detecting a temperature of the lower wall surface of the inner pot.

It is to be noted that, in the example shown in FIG. 3, the first temperature sensor 40 has a detection part and an elastic part, and the detection part abuts with the lower wall surface of the inner pot to detect the temperature of the lower wall surface of the inner pot. When the inner pot is arranged in the outer pot, the inner pot compresses the elastic part, so that the detection part may be closely fitted with the lower wall surface of the inner pot, to improve the accuracy of the temperature detection. In FIG. 3, the detection part passes through the lower wall surface of the inner pot, indicating that the detection part abuts with the lower wall surface of the inner pot, and the elastic part shown is in an uncompressed state, while the elastic part is actually in a compressed state, and the detection part abuts against the lower wall surface of the inner pot.

According to some embodiments of the present disclosure, as shown in FIG. 3 and FIG. 5, the first pot cover assembly 30 may further include a fan assembly 34, and the fan assembly 34 may be arranged to the pot cover body 31. During the operation of the fan assembly 34, it may blow a wind into the cooking chamber 101 to blow the hot air heated by the second heating assembly 33 into the cooking chamber 101 to realize the processing of the food material in the cooking chamber 101, such as heating, baking and air frying, etc. In an embodiment where the first upper coupler 32 and the lower coupler 11 are included, the fan assembly 34 may be connected with the first upper coupler 32. When the cooking appliance 100 is in the first cooking mode, the first upper coupler 32 is coupled with the lower coupler 11 so that the fan assembly 34 may be energized to operate.

In one embodiment, as shown in FIGS. 2 and 3, the second heating assembly 33 may be arranged at a lower side of the fan assembly 34, so that the efficiency of blowing the hot air into the cooking chamber 101 by the fan assembly 34 is higher.

In some embodiments of the present disclosure, the second cooking mode may be a pressure cooking mode. Under the pressure cooking mode, the first heating assembly 12 may heat the food material in the pot body assembly 10, and through the fit of the second pot cover assembly 20 with the pot body assembly 10, an air pressure in the cooking chamber 101 of the pot body assembly 10 may be changed to generate a positive pressure (i.e. the pressure in the cooking chamber 101 is greater than an ambient pressure) or a negative pressure (i.e. the pressure in the cooking chamber is less than the ambient pressure). Under the pressure cooking mode, the food material may be processed, such as being braised, boiled, stewed, etc. The food material may be cooked with high cooking efficiency, and the nutritional extraction effect is better. In one embodiment, the first heating assembly 12 may heat from at least one of the bottom and the side of the food material.

The first cooking mode may be a baking cooking mode. Under the baking cooking mode, the second heating assembly 33 may heat the food material in the cooking chamber 101 of the pot body assembly 10 from the upper side, to realize the processing of the food material, such as baking, frying and air frying. The heating of the food material is even and the baking effect is good.

Thus, the cooking appliance 100 is configured as a baking electric pressure cooker, which has two cooking functions of pressure cooking and baking cooking. The cooking appliance 100 may realize the integrated cooking of stewing and frying, and achieve the operation of stewing and frying in one pot, which provides strong practicability.

Of course, in other embodiments of the present disclosure, the second cooking mode may be the baking cooking mode and the first cooking mode may be the pressure cooking mode. That is, under the pressure cooking mode, the second heating assembly 33 heats the food material in the pot body assembly 10, and under the baking cooking mode, the first heating assembly 12 heats the food material in the pot body assembly 10.

In some other embodiments of the present disclosure, the first cooking mode and the second cooking mode may also be an air frying cooking mode, a porridge cooking mode, a soup cooking mode or the like, respectively, and the cooking appliance 100 may be used as an air fryer, an electric rice cooker, a soup pot, a stew pot, etc.

In the present disclosure, the cooking appliance 100 may be an electric rice cooker, a stew pot, a pressure cooker, etc.

According to some embodiments of the present disclosure, the first cooking mode may include a constant temperature stage or a constant power stage. In the constant power stage, both the first heating assembly 12 and the second heating assembly 33 heat at a constant power. In the constant temperature stage, the first heating assembly 12 may heat alternately between at least two heating powers and the second heating assembly 33 may heat alternately between at least two heating powers. Thus, the first heating assembly 12 and the second heating assembly 33 may have more heating modes, and the first heating assembly 12 and the second heating assembly 33 have a lower energy consumption while meeting the temperature requirements of the first cooking mode, without operating continuously at a high heating power, which is conducive to improving the service life of the first heating assembly 12 and the second heating assembly 33. Under the first cooking mode, both the first heating assembly 12 and the second heating assembly 33 may heat the food material, to cook the food material from different sides of the food material, so that the heating of the food material is more even, which is conducive to improving the cooking effect of the food material.

Further, a range of the heating temperature of the first heating assembly 12 may be 100° C.-200° C. For example, a heating temperature t1 of the first heating assembly 12 may be 100° C., 120° C., 150° C., 180° C. and 200° C. A range of the heating temperature of the second heating assembly 33 may be 100° C.-200° C. For example, a heating temperature t2 of the second heating assembly 33 may be 100° C., 120° C., 150° C., 180° C. and 200° C. It is to be noted that the heating temperature t1 of the first heating assembly 12 and the heating temperature t2 of the second heating assembly 33 may be the same or different.

In some embodiments of the present disclosure, when the cooking appliance 100 is in the first cooking mode, a total operating time of the first heating assembly 12 is T1, and a duration of the first cooking mode is T0, in which T1≤T0. That is, under the first cooking mode, the first heating assembly 12 may operate continuously and the continuous operating time of the first heating assembly 12 is no more than T0, or the first heating assembly 12 may operate intermittently to reduce the energy consumption and improve the service life of the first heating assembly 12 on the premise of meeting the cooking needs.

In one embodiment, a total operating time of the second heating assembly 33 is T2, and the duration of the first cooking mode is T0, in which T2≤T0. That is, under the first cooking mode, the second heating assembly 33 may operate continuously and the continuous operating time of the second heating assembly 33 is no more than T0, or the second heating assembly 33 may operate intermittently to reduce the energy consumption and improve the service life of the second heating assembly 33 under the premise of meeting the cooking needs.

In the present disclosure, the heating power of the first heating assembly 12 may include two, three or more, and the heating power of the second heating assembly 33 may include two, three or more. The heating manner of the cooking appliance 100 according to the embodiment of the present disclosure is described below by taking an example that the first heating assembly 12 includes two heating powers and the second heating assembly 33 includes two heating powers. According to the following description, embodiments, where the first heating assembly 12 includes three or more heating powers and the second heating assembly 33 includes three or more heating powers.

Figure 6:
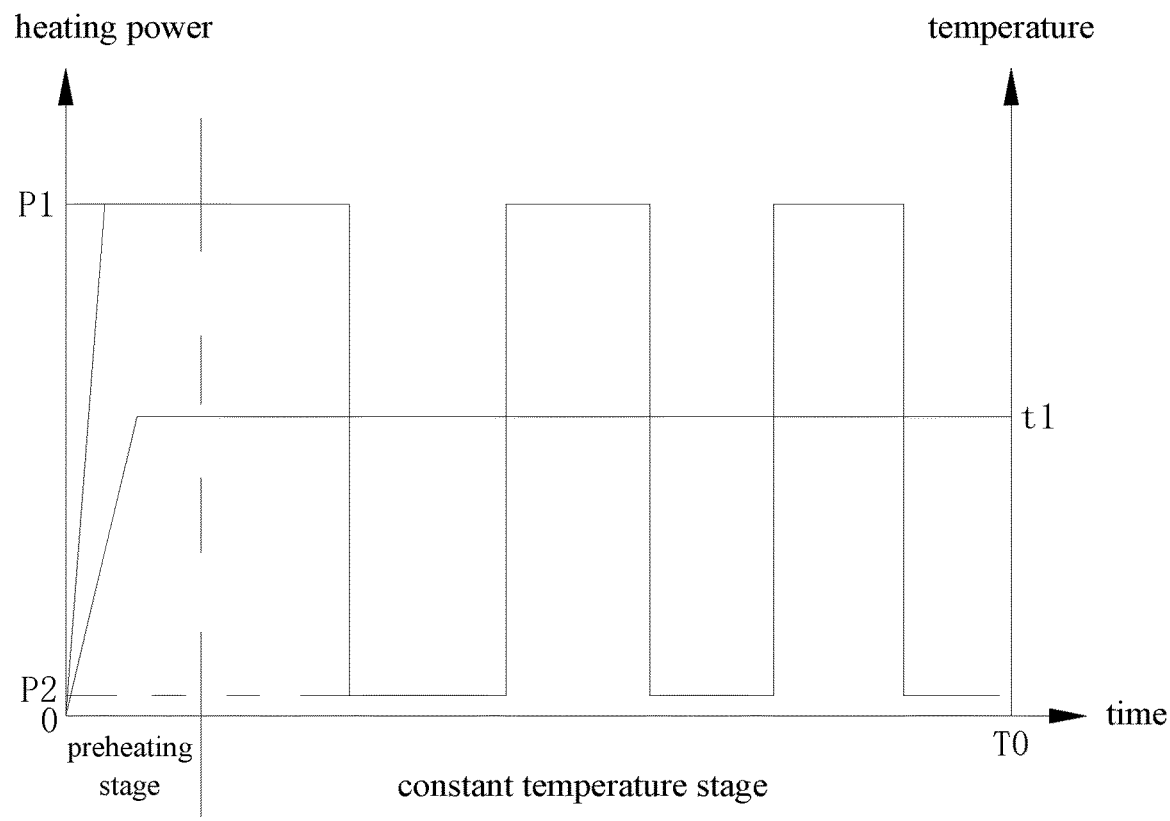
FIG. 6 is a schematic diagram of an operating process of a first heating assembly of a cooking appliance according to an embodiment of the present disclosure.
Figure 7:
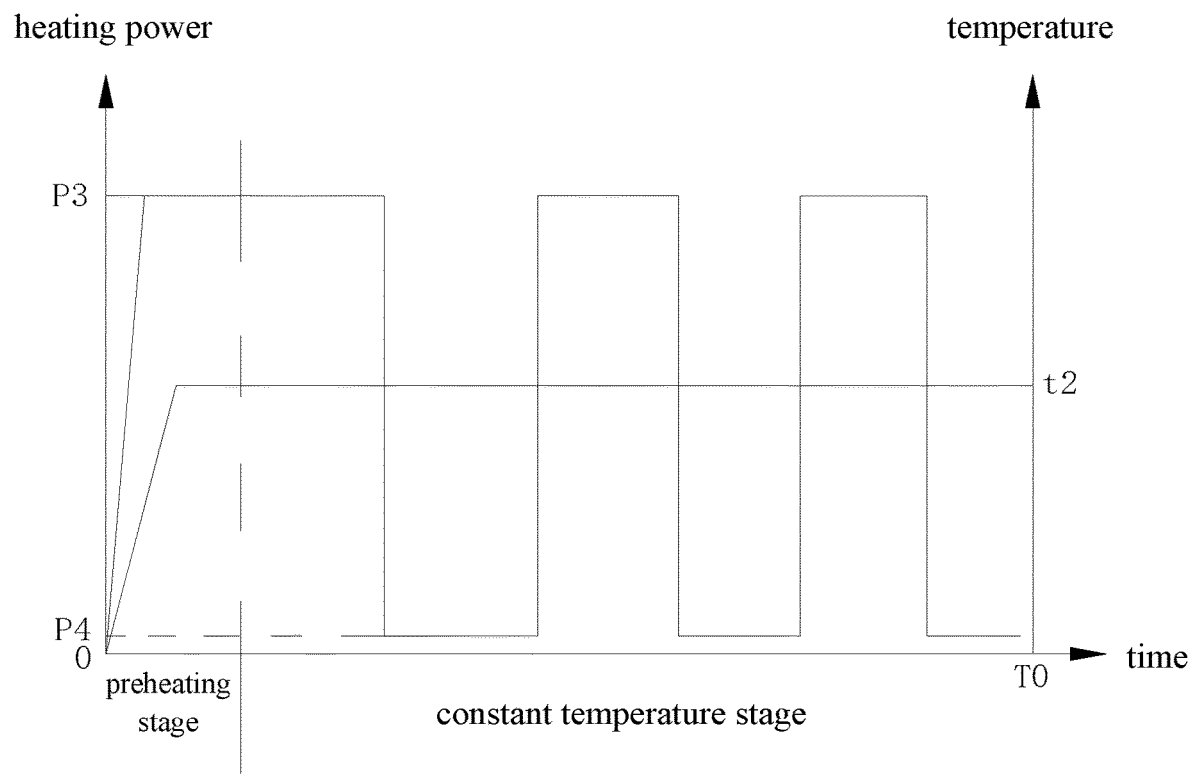
FIG. 7 is a schematic diagram of an operating process of a second heating assembly of a cooking appliance according to an embodiment of the present disclosure.

According to some embodiments of the present disclosure, as shown in FIG. 6, the heating power of the first heating assembly 12 includes a first heating power P1 and a second heating power P2, and the first heating assembly 12 may heat alternately with the first heating power P1 and the second heating power P2. As shown in FIG. 7, the heating power of the second heating assembly 33 includes a third heating power P3 and a fourth heating power P4, and the second heating assembly 33 may heat alternately with the third heating power P3 and the fourth heating power P4. P1>P2, P3>P4, P2≥0, P4≥0.

That is, the first heating assembly 12 may heat alternately with the high heating power and the low heating power, or the first heating assembly 12 may stop heating for a period of time after heating for a period of time and alternate in this manner. The second heating assembly 33 may heat alternately with the high heating power and the low heating power, or the second heating assembly 33 may stop heating for a period of time after heating for a period of time and alternate in this manner.

It should be noted that P1 and P3 may be the same or different, and P2 and P4 may be the same or different. In addition, "the high heating power" and "the low heating power" herein are relatively high and low. P1 is compared with P2, P1 is the high heating power, and P2 is the low heating power. P3 is compared with P4, P3 is the high heating power, and P4 is the low heating power. A heating time of the first heating assembly 12 heating with the first heating power P1 and a heating time of the first heating assembly 12 heating with the second heating power P2 may be the same or different each time. Two adjacent heating times of the first heating assembly 12 heating with the first heating power P1 may be the same or different, and two adjacent heating times of the first heating assembly 12 heating with the second heating power P2 may be the same or different. A heating time of the second heating assembly 33 heating with the third heating power P3 and a heating time of the second heating assembly 33 heating with the fourth heating power P4 may be the same or different each time. Two adjacent heating times of the second heating assembly 33 heating with the third heating power P3 may be the same or different, and two adjacent heating times of the second heating assembly 33 heating with the fourth heating power P4 may be the same or different.

In addition, when the first heating assembly 12 heats alternately with the first heating power P1 and the second heating power P2 and the second heating assembly 33 heats alternately with the third heating power P3 and the fourth heating power P4, the first heating assembly 12 and the second heating assembly 33 may heat simultaneously with the high heating power, or heat intermittently alternately with the high heating power. Or, a time difference exists between the times of the first heating assembly 12 and the second heating assembly 33 operating with the high heating power.

Figure 8:
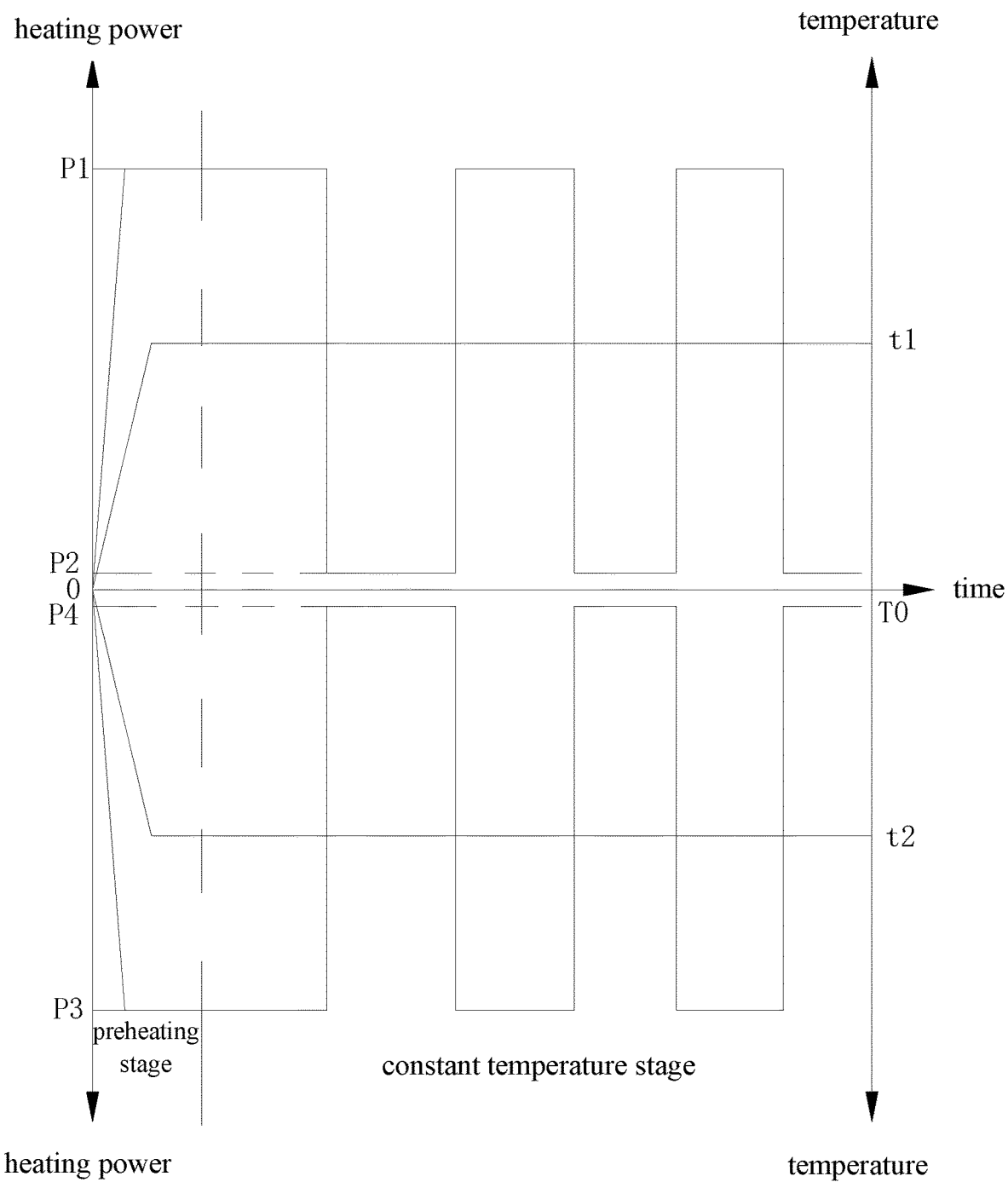
FIG. 8 is a schematic diagram of an operating process of a cooking appliance according to an embodiment of the present disclosure.

For example, in some specific embodiments, the first heating assembly 12 heats the food material from the lower side, and the second heating assembly 33 heats the food material from the upper side. As shown in FIG. 8, the first heating assembly 12 and the second heating assembly 33 heat with the high heating power in a full synchronization. In one embodiment, when the heating power of the first heating assembly 12 is the first heating power P1, the heating power of the second heating assembly 33 is the third heating power P3; and when the heating power of the first heating assembly 12 is the second heating power P2, the heating power of the second heating assembly 33 is the fourth heating power P4. Thus, the synchronous heating of the first heating assembly 12 and the second heating assembly 33 is realized. The first heating assembly 12 and the second heating assembly 33 operate with the high heating power simultaneously, to heat the food material from both the upper and lower sides of the food material simultaneously. The food material may quickly be cooked from the upper and lower surfaces into the interior. The cooking efficiency is high and the cooking time is short, and the upper and lower parts of the food material are heated evenly.

Figure 9:
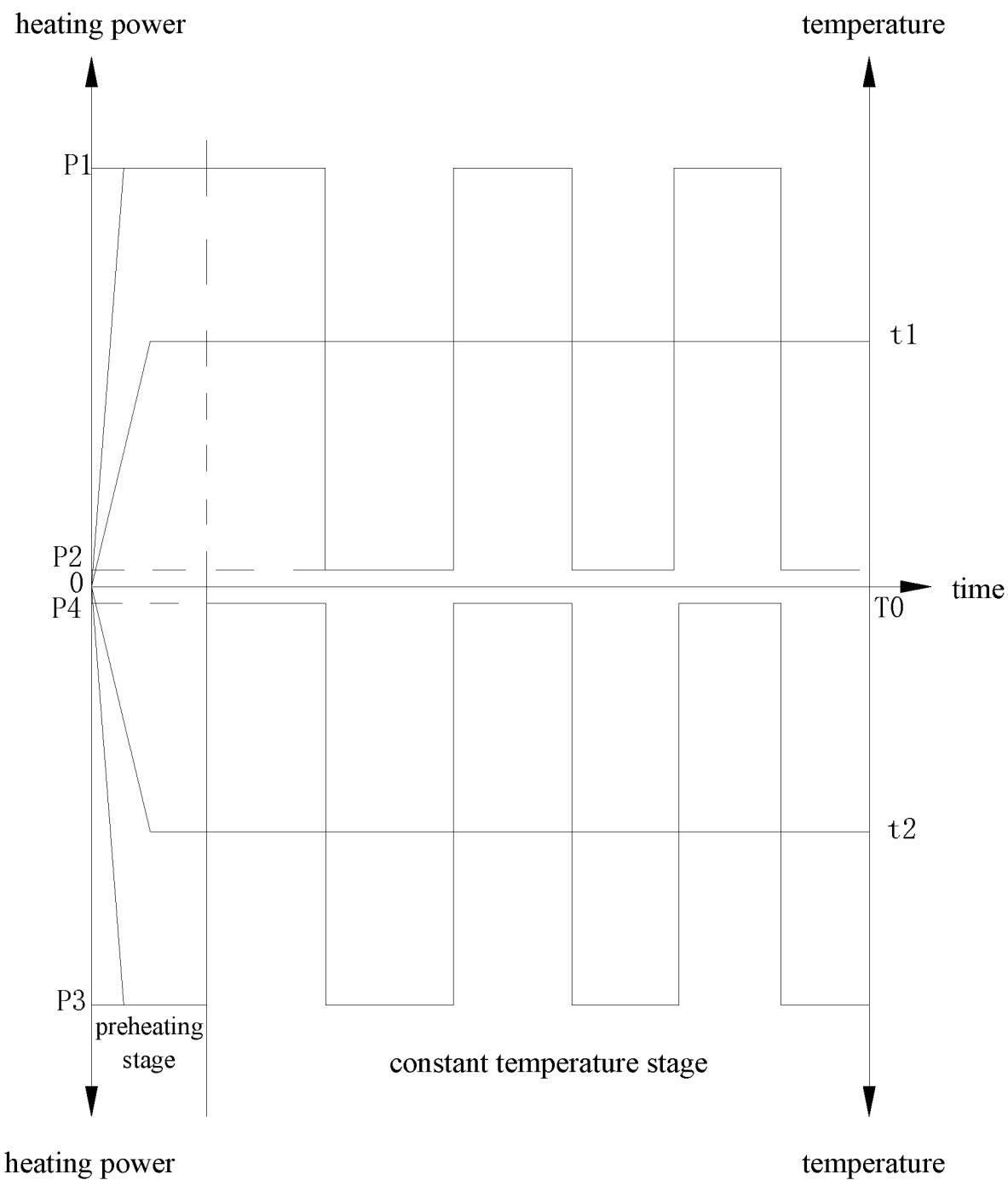
FIG. 9 is a schematic diagram of an operating process of a cooking appliance according to another embodiment of the present disclosure.

In some other specific embodiments, the first heating assembly 12 heats the food material from the lower side, and the second heating assembly 33 heats the food material from the upper side. As shown in FIG. 9, the first heating assembly 12 and the second heating assembly 33 heat with the high heating power intermittently alternately. In one embodiment, when the heating power of the first heating assembly 12 is the first heating power P1, the heating power of the second heating assembly 33 is the fourth heating power P4; and when the heating power of the first heating assembly 12 is the second heating power P2, and the heating power of the second heating assembly 33 is the third heating power P3. Thus, the alternate heating of the first heating assembly 12 and the second heating assembly 33 is realized. The cooking time of this cooking manner is slightly longer than that of the cooking manner shown in FIG. 8. However, a material on the surface of the feeding material may gradually permeate into the interior of the food material in each alternate heating, so that the food material is tastier and has a better mouthfeel.

Figure 10:
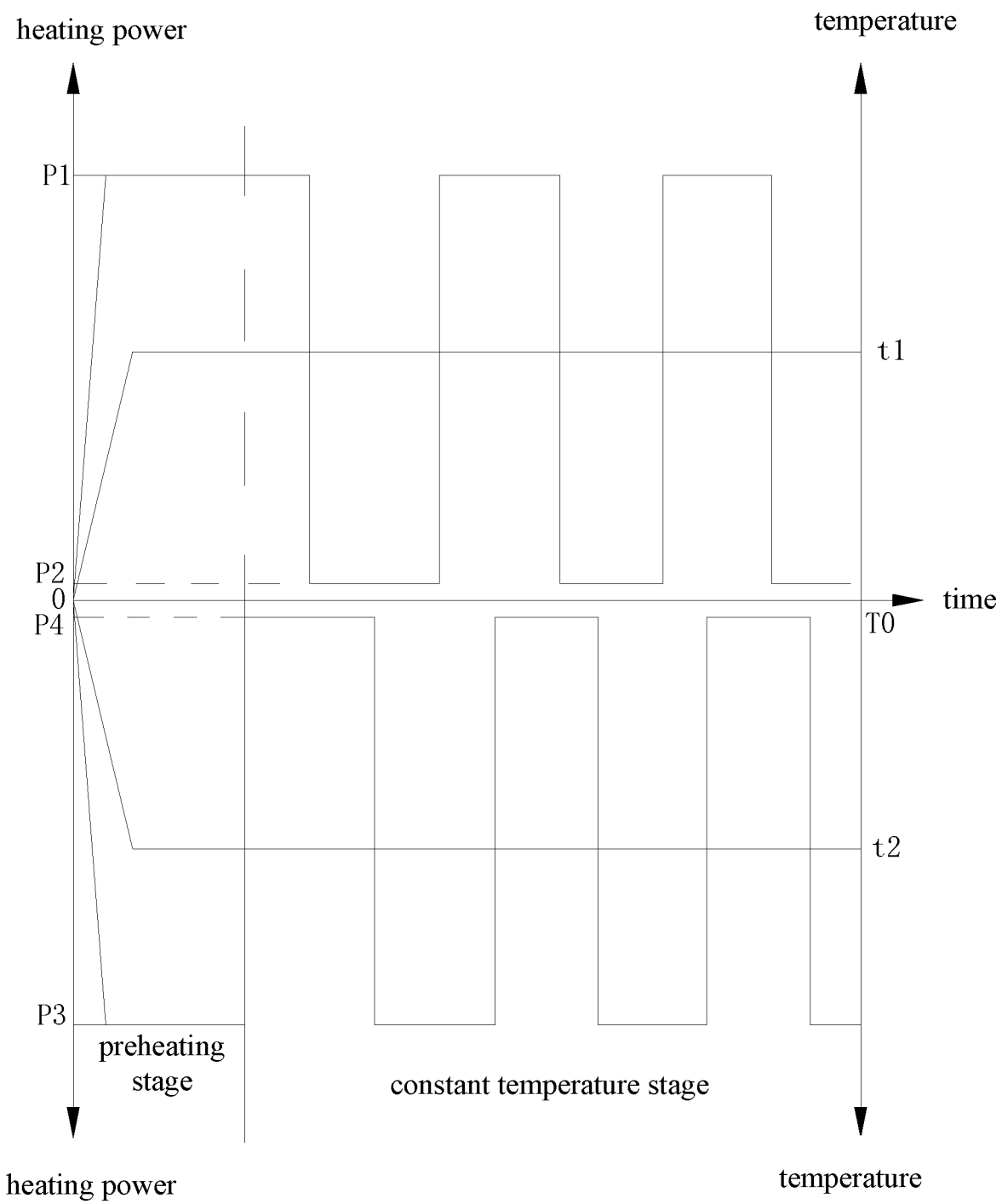
FIG. 10 is a schematic diagram of an operating process of a cooking appliance according to still another embodiment of the present disclosure.

In still some other specific embodiments, the first heating assembly 12 heats the food material from the lower side, and the second heating assembly 33 heats the food material from the upper side. As shown in FIG. 10, there is a time difference between the times of the first heating assembly 12 and the second heating assembly 33 operating with the high heating power. In one embodiment, when the heating power of the first heating assembly 12 is the first heating power P1, the second heating assembly 33 switches to the fourth heating power P4 and heats for a second predetermined time after heating with the third heating power P3 for a first predetermined time; and when the first heating assembly 12 heats with the second heating power P2, the second heating assembly 33 switches to the third heating power P3 and continues for a fourth predetermined time after heating with the fourth heating power P4 for a third predetermined time. Thus, the staggered heating of the first heating assembly 12 and the second heating assembly 33 is realized. The cooking time of this cooking manner is between the cooking times of the two cooking manners shown in FIG. 8 and FIG. 9, thus taking into account the cooking efficiency and the taste effect. That is, the cooking efficiency is improved, and the taste effect of the food material is also better. Moreover, in the cooking process, the high power operation of the first heating assembly 12 and the high power operation of the second heating assembly 33 are seamlessly connected, thus realizing the seamless connection of the heating cooking, which is conducive to improving the cooking effect and the cooking efficiency.

Of course, in the embodiment where there is the time difference between the times of the first heating assembly 12 and the second heating assembly 33 operating with the high heating power, it may also be the following situation: when the heating power of the first heating assembly 12 is the first heating power P1, the second heating assembly 33 switches to the third heating power P3 and heats for a sixth predetermined time after heating with the fourth heating power P4 for a fifth predetermined time; when the first heating assembly 12 heats with the second heating power P2, the second heating assembly 33 switches to the fourth heating power P4 and continues for an eighth predetermined time after heating with the third heating power P3 for a seventh predetermined time.

According to a further embodiment of the present disclosure, as shown in FIGS. 6-10, the first cooking mode may further include a preheating stage. In the preheating stage, the heating power of the first heating assembly 12 increases uniformly from zero to a highest heating power, and the heating power of the first heating assembly 12 is kept at the highest heating power until the preheating stage ends; and the heating power of the second heating assembly 33 increases uniformly from zero to a highest heating power, and the heating power of the second heating assembly 33 is kept at the highest heating power until the preheating stage ends.

Here, the highest heating power may be one having the maximum value of at least two heating powers. For example, when the heating power of the first heating assembly 12 includes the first heating power P1 and the second heating power P2 and P1>P2, the highest heating power of the first heating assembly 12 is the first heating power P1. When the heating power of the second heating assembly 33 includes the third heating power P3 and the fourth heating power P4 and P3>P4, the highest heating power of the second heating assembly 33 is the third heating power P3.

Correspondingly, in the preheating stage, the heating temperature of the first heating assembly 12 may increase from zero or from a normal temperature to a highest temperature, and may be kept at the highest temperature until the preheating stage ends; the heating temperature of the second heating assembly 33 may increase from zero or from a normal temperature to a highest temperature, and may be kept at the highest temperature until the preheating stage ends.

Here, the highest temperature may be a heating temperature in the constant temperature stage. For example, the heating temperature of the first heating assembly 12 in the constant temperature stage is t1, and the heating temperature of the second heating assembly 33 in the constant temperature stage is t2. Thus, the highest temperature of the first heating assembly 12 may be t1 and the highest temperature of the second heating assembly 33 may be t2.

Other configurations and operations of the cooking appliance 100 according to the embodiments of the present disclosure, and are not described in detail here.

In the descriptions of the present disclosure, it should be noted that unless specified or limited otherwise, the terms "installed", "interconnected" and "connected" shall be broadly understood. For example, they may be fixed connections, or detachable connections or integrated connections; they may be mechanical connections or electric connections; they may also be direct connections or indirect connections through intermediate medium, and may also be inner communications of two elements. The specific meaning of the above terms in the present disclosure may be understood according to specific circumstances.

Reference throughout this specification to terms "an embodiment," "a specific embodiment," "an example," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Moreover, the particular features, structures, materials, or characteristics described may be combined in any suitable manner in one or more embodiments or examples.

What is claimed is:

1. A cooking appliance, having a first cooking mode and comprising:
   a pot body assembly provided with a first electric heater for heating a food material in a cooking chamber of the pot body assembly;
   a first pot cover assembly comprising a pot cover body and provided with a second electric heater for heating the food material in the cooking chamber, the first pot cover assembly being closed on the pot body assembly, wherein when the cooking appliance receives a cooking instruction, the first electric heater and the second electric heater both heat the food material in the cooking chamber, and the cooking appliance is in a first cooking mode;
   wherein the first cooking mode comprises a constant temperature stage or a constant power stage, and in the constant temperature stage, the first electric heater heats switchably between at least two heating powers, and the second electric heater heats switchably between at least two heating powers;
   wherein the first cooking mode further comprises a preheating stage, and in the preheating stage, a heating power of the first electric heater increases uniformly from zero to a highest heating power and is kept at the highest heating power until the preheating stage ends, and a heating power of the second electric heater increases uniformly from zero to a highest heating power and is kept at the highest heating power until the preheating stage ends.

2. The cooking appliance according to claim 1, wherein the pot body assembly is provided with a lower coupler, the first pot cover assembly has a first upper coupler arranged to the pot cover body, and when the first pot cover assembly is closed on the pot body assembly, the lower coupler is coupled with the first upper coupler so that the second electric heater is energized to operate.

3. The cooking appliance according to claim 2, wherein the cooking appliance further has a second cooking mode, the cooking appliance further comprises a second pot cover assembly closed on the pot body assembly, and when the first electric heater operates, the cooking appliance is in the second cooking mode.

4. The cooking appliance according to claim 3, wherein the second pot cover assembly is provided with a second upper coupler, and when the cooking appliance is in the second cooking mode, the lower coupler is coupled with the second upper coupler.

5. The cooking appliance according to claim 2, wherein the pot body assembly comprises:
   a housing;
   a pot body arranged in the housing, the first electric heater being arranged in the pot body;
   a controller connected with the housing and configured to control the first electric heater and the second electric heater to operate, the second electric heater achieving a signal connection through the first upper coupler and the lower coupler.

6. The cooking appliance according to claim 5, further comprising:
   a first temperature sensor for detecting a temperature in the cooking chamber, the controller being connected with the first temperature sensor to control the first electric heater to operate according to a temperature detection result of the first temperature sensor; and
   a second temperature sensor for detecting a temperature in the cooking chamber, the controller being connected with the second temperature sensor to control the second electric heater to operate according to a temperature detection result of the second temperature sensor.

7. The cooking appliance according to claim 6, wherein the first electric heater is arranged to a bottom of the pot body assembly, the first temperature sensor is configured to detect a temperature in a lower part of the cooking chamber, and the second temperature sensor is connected with the pot cover body and configured to detect a temperature in an upper part of the cooking chamber.

8. The cooking appliance according to claim 7, wherein the second electric heater comprises a heating tube extending horizontally and spirally, and the second temperature sensor is arranged in a center of the heating tube.

9. The cooking appliance according to claim 1, wherein the first pot cover assembly further comprises a fan assembly arranged to the pot cover body, and when the cooking appliance is in the first cooking mode, the fan assembly is energized to operate to blow a wind into the cooking chamber.

10. The cooking appliance according to claim 3, wherein the second cooking mode is a pressure cooking mode, and the first cooking mode is a baking cooking mode.

11. The cooking appliance according to claim 1, wherein when the cooking appliance is in the first cooking mode, a total operating time of the first electric heater is T1, and a duration of the first cooking mode is T0, wherein $T1 \leq T0$.

12. The cooking appliance according to claim 1, wherein the heating power of the first electric heater comprises a first heating power P1 and a second heating power P2, and the first electric heater heats alternately with the first heating power P1 and the second heating power P2,
   the heating power of the second electric heater comprises a third heating power P3 and a fourth heating power P4, and the second electric heater heats alternately with the third heating power P3 and the fourth heating power P4,
   wherein $P1>P2$, $P3>P4$, $P2 \geq 0$, $P4 \geq 0$.

13. The cooking appliance according to claim 12, wherein when the heating power of the first electric heater is the first heating power P1, the heating power of the second electric heater is the fourth heating power P4, and when the heating power of the first electric heater is the second heating power P2, the heating power of the second electric heater is the third heating power P3; or
   when the heating power of the first electric heater is the first heating power P1, the heating power of the second electric heater is the third heating power P3, and when the heating power of the first electric heater is the second heating power P2, the heating power of the second electric heater is the fourth heating power P4; or
   when the heating power of the first electric heater is the first heating power P1, the second electric heater switches to the fourth heating power P4 and heats for a second predetermined time after heating with the third heating power P3 for a first predetermined time, and when the first electric heater heats with the second heating power P2, the second electric heater switches to the third heating power P3 and continues for a fourth predetermined time after heating with the fourth heating power P4 for a third predetermined time.

* * * * *